(12) United States Patent
Crisp

(10) Patent No.: US 9,298,569 B1
(45) Date of Patent: Mar. 29, 2016

(54) LOG STORAGE AND RETRIEVAL FOR BROADBAND COMMUNICATIONS DEVICES

(75) Inventor: Russell Crisp, Atlanta, GA (US)

(73) Assignee: ARRIS Enterprises, Inc., Suwanee, GA (US)

(*) Notice: Subject to any disclaimer, the term of this patent is extended or adjusted under 35 U.S.C. 154(b) by 1260 days.

(21) Appl. No.: 12/617,940

(22) Filed: Nov. 13, 2009

(51) Int. Cl.
*G06F 11/00* (2006.01)
*G06F 11/22* (2006.01)

(52) U.S. Cl.
CPC .................................. *G06F 11/2294* (2013.01)

(58) Field of Classification Search
USPC ............................................................ 714/46
See application file for complete search history.

(56) References Cited

U.S. PATENT DOCUMENTS

| | | | | |
|---|---|---|---|---|
| 6,647,517 | B1 * | 11/2003 | Dickey et al. | 714/48 |
| 6,650,949 | B1 * | 11/2003 | Fera et al. | 700/79 |
| 7,213,176 | B2 * | 5/2007 | Banko | 714/38.12 |
| 7,356,590 | B2 * | 4/2008 | Wilson et al. | 709/224 |

OTHER PUBLICATIONS

User Guide for Fault Diagnostics Jan. 29, 2007.*

* cited by examiner

*Primary Examiner* — Amine Riad
(74) *Attorney, Agent, or Firm* — Troy A. Van Aacken

(57) ABSTRACT

Systems and methods can provide for log storage and retrieval from broadband communications devices. In some implementations, such systems and methods can detect unanticipated errors or failures, can process and store logs, and can operate to transmit the logs to an external central server. In other implementations, an external central server can retrieve stored logs. The logs can be gathered to analyze and resolve problems with the broadband communications devices and to facilitate notification to a central location of potential device and/or customer issues.

20 Claims, 6 Drawing Sheets

LOG STORAGE AND RETRIEVAL FOR BROADBAND COMMUNICATIONS DEVICES

TECHNICAL FIELD

This disclosure relates to log storage and retrieval for broadband communications devices.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

Broadband services can be delivered via existing cable infrastructure from MSOs, digital subscriber lines (xDSL), integrated service digital network (ISDN), public switched telephone networks, or T1 connections from telecommunications operators or internet service providers, satellite from satellite operators, or wireless services (such as, e.g., cellular, 802.11 or Wi-MAX standards) from wireless service providers, among many others. Subscribers typically access multiple broadband communications devices at their location to provide such varied services.

After devices are deployed into service, they typically have a relatively long service life. However, occasionally devices that have been deployed experience software or firmware failures, such as processor exceptions or traps. Typically when such failures occur, the device is replaced by a service technician associated with the MSO and the MSO ships the device back to the manufacturer for diagnosis. However, this service process can be inefficient.

SUMMARY

Briefly described, and according to an example implementation, this disclosure describes systems and methods for log storage and retrieval for broadband communications devices. One example method of log storage and retrieval can provide: detection of an unanticipated failure in a broadband communications device (e.g. customer premise equipment (CPE) device); processing and storing of logs in non-volatile memory (NVM); setting a flag in NVM capable of alerting the CPE device of the unanticipated failure following restart; transmitting the logs to an external central server; and clearing the flag.

Other systems, methods, features and advantages of the present disclosure will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many details of the disclosure can be better understood with reference to the following drawings. The components in the drawings are not necessarily to scale, emphasis instead being place upon clearly illustrating the principles of the preset disclosure.

DETAILED DESCRIPTION

In some implementations of this disclosure, systems and methods can operate to detect an unanticipated device failure and to identify the characteristics and mechanism for processing and storing configuration and diagnostic data logs for communication back to a manufacturer of the device. The configuration and diagnostic data logs (e.g., "logs") can include, for example, register settings, program counters, stack dumps, and code execution back traces. Moreover, processing and storing of logs can occur in non-volatile memory (NVM), where contents are retained after restart. In some implementations, the device can also set a flag in NVM to alert itself or an external device that an unanticipated failure has occurred and that relevant logs have been stored. For example, following a processor exception and subsequent processing and storing of logs into NVM, a device can also set a failure flag register in the form of a processor interrupt in NVM that is identifiable after restart.

Systems and methods of this disclosure can also operate to provide a mechanism for remote retrieval of logs. In some implementations, after the CPE device has restarted, the CPE identifies that a failure flag has been set and the CPE device can automatically transmit logs to a central server and clear the flag. In other implementations, a central server can periodically poll devices for a failure flag and retrieve logs from any devices that have the failure flag register set. Upon retrieval of the logs, the central server can instruct devices with a set failure flag register to reset the failure flag. In various implementations, the logs are text files sent to the central server in the form of TCP/IP packets. For example, the CPE device can use the Trivial File Transfer Protocol (TFTP) or other standard or proprietary protocol to transmit a text file to the central server.

Figure 1:
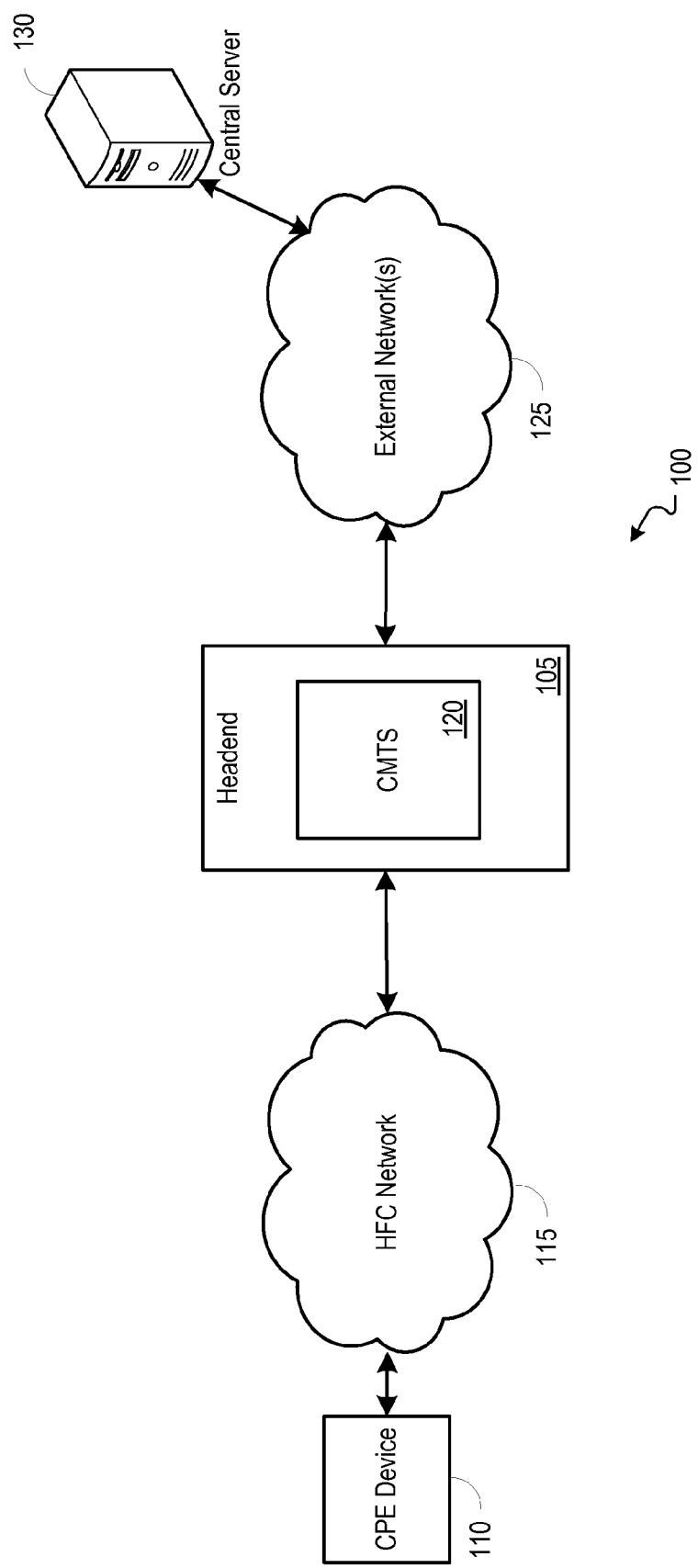
FIG. 1 is a block diagram illustrating an exemplary network environment operable to provide log storage and retrieval.

FIG. 1 is a block diagram illustrating an exemplary network environment 100 operable to provide log storage and retrieval. In some implementations, a headend 105 can provide video, data and/or voice service(s) to a CPE device 110 through a hybrid fiber-coax (HFC) network 115. The headend 105 can include devices such as a cable modem termination system (CMTS) 120 and/or an edge quadrature amplitude modulation (EQAM) device, or a combined device including multiple edge and/or video or data processing functionalities. Such devices can operate to facilitate communications between an external network(s) 125 and the CPE device 110. In various implementations, the external network(s) 125 can include one or more networks internal to the headend 105 and/or one or more networks external to the headend 105 (e.g., one or more extranets, the Internet, etc.).

Data services can be handled by the headend 105 through a CMTS 120. The CMTS 120 can transmit data to and receive data from the CPE device 110 through the HFC network 115.

A central server 130 can be deployed to transmit and receive signals from the CPE device 110 and/or the CMTS 120 through various external network(s) 125 (e.g. including the internet). The external network(s) 125, for example, can operate using internet protocol (IP), transmitting data packets to and receiving data packets from the central server 130. In other examples, the central server 130 can be coupled to the HFC network 115 and/or the headend 105.

The central server 130 can include devices such as a server or other device that is operable to receive and/or retrieve logs from a CPE device 110. In other implementations, the central server 130 can retrieve logs from the CMTS 120 in the event of an unanticipated failure. In still further implementations, the central server 130 resides inside the headend 105 or another device attached to either the HFC network 115 or another external network(s) 125.

Figure 2:
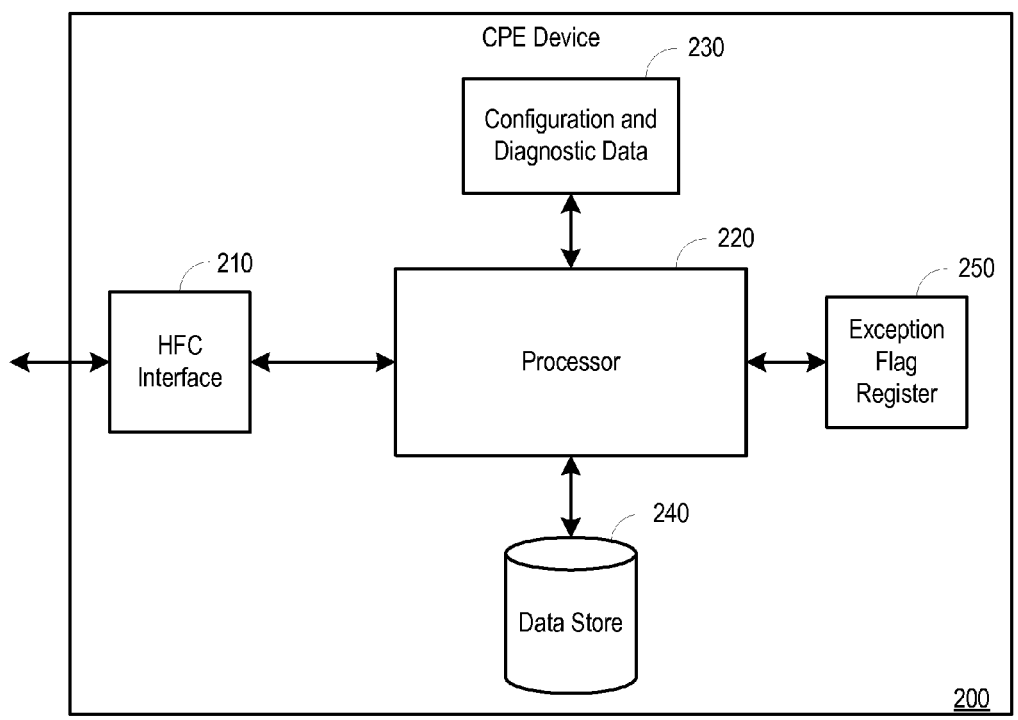
FIG. 2 is a block diagram illustrating an example broadband communications device operable to provide log storage and retrieval.

FIG. 2 is a block diagram illustrating an example broadband communications device operable to provide log storage and retrieval. The CPE device 200 can include an HFC interface 210, a processor 220, configuration and diagnostic data 230, a data store 240, and a failure flag register 250. The HFC interface 210 can facilitate receipt and transmission of communications via the HFC network. Downstream signals can be received from one or more external source through the headend CMTS and via the HFC network. Upstream signals can be sent to external network(s) through the headend CMTS via the HFC network.

The processor 220 can control various functionalities associated with the device. In some implementations, these functionalities can include executing the log storage and retrieval. The configuration and diagnostic data 230, data store 240, and the HFC interface 210 are accessible to the processor 220 to facilitate processing, storing, and transmitting logs. In addition, the processor 220 can set a failure flag at the failure flag register 250, to alert itself or external devices (e.g., a central server 130 of FIG. 1) to a previous unanticipated failure.

The configuration and diagnostic data 230 can include register values, program counters, stack dumps, and code execution back traces. Upon occurrence of an unanticipated failure, such as a processor exception, the processor can gather and assemble the configuration and diagnostic data 230 into logs operable to be stored to data store 240. In some examples, the logs can include hardware or software program values. In other examples, the logs can contain any storable configuration and diagnostic information internal or external to the CPE device 200.

In various implementations, the data store 240 can include NVM, volatile memory, a hard disk drive (HDD), or any other type of data storage system. The data store can be accessed by the processor 220 to store and retrieve data, including, e.g., configuration and diagnostic data. In those implementations where the data store includes volatile memory, the data store 240 can be a random access memory (RAM) that is intended not to be refreshed or cleared upon restart. In some implementations, the data store 240 is accessible by an external device (e.g., a central server 130 of FIG. 1). In other implementations, a data store 240 can be removed because the logs can be transmitted immediately upon detection of an unanticipated failure.

In various implementations, the failure flag register 250 can be a register, NVM, RAM, or any other mechanism accessible by the processor 220 or other external device. In other implementations, the failure flag register 250 can be located external to the CPE device 200, e.g., residing in an external device. In still further implementations, the failure flag register 250 can be eliminated in favor of immediately transmitting notice to an external device.

Figure 3:
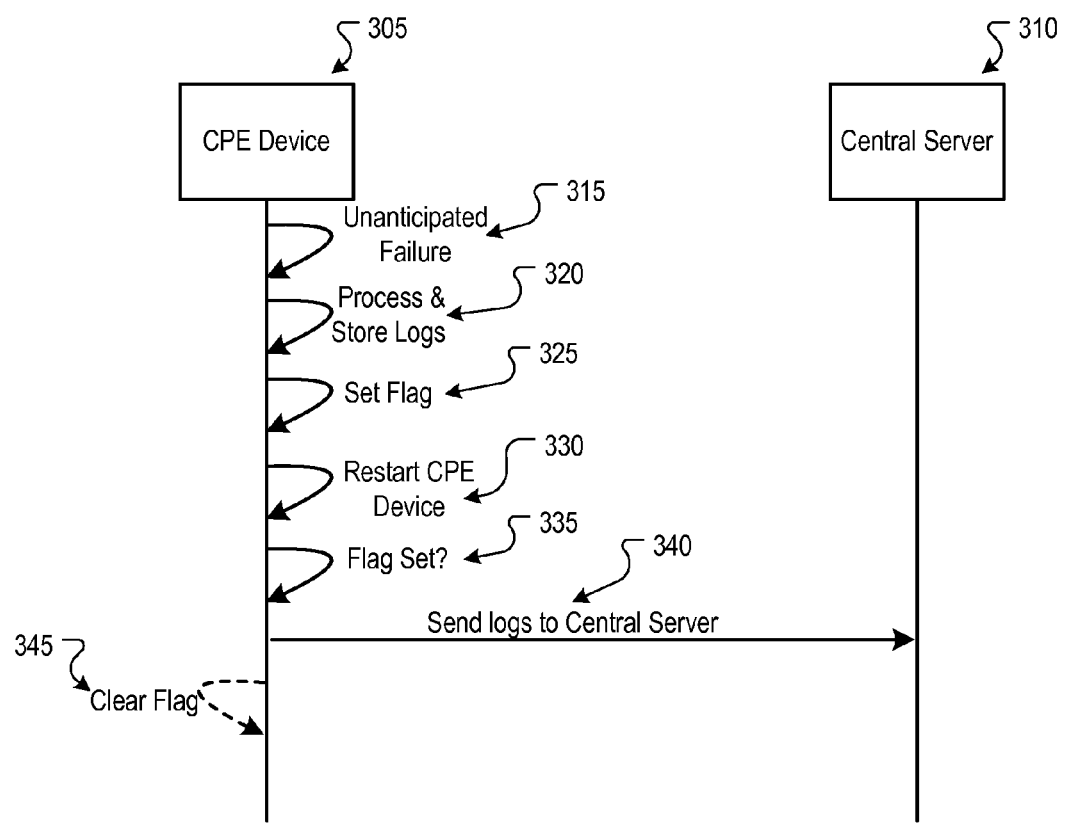
FIG. 3 is a sequence diagram illustrating an example method operable to provide log storage and retrieval.

FIG. 3 is a sequence diagram illustrating an example method operable to provide log storage and retrieval. The initialization flow for the log storage and retrieval from the CPE device 305 to the central server 310 can begin with an unanticipated failure (315). An unanticipated failure can be the result of the processor experiencing an exception. In various examples, the exception can be the result of a hardware or software error (e.g., data overflow, data type error, infinite loop, etc.). Upon the identification of an exception, a processor can invoke failure handling processes.

In some implementations, the failure handling processes can include instructing the CPE device 305 to process and store logs in NVM (320). The logs can include, for example, current configuration data associated with the device. The logs can also include register values, program counters, stack dumps, and code execution back traces associated with the process which caused the exception.

Subsequent to storing the logs to NVM, the failure handling processes can instruct the CPE device 305 to set a failure flag register (325). The failure flag register can be operable to alert the device (or an external device) to the unanticipated failure and to the existence of the stored logs following restart.

In some implementations, the CPE device 305 can then restart (330). The restart (330) can be performed as a soft restart (e.g., a re-initialization without full power-down). Upon restart, the CPE device 305 can detect that the failure flag register has been set (335). In response to the failure flag register being set, the CPE device 305, in some implementations, can then proceed to transmit the logs to the central server 310 (340). After transmission of the logs to the central server 310, the CPE device 305 can clear (e.g., reset) the failure flag register (345).

In alternative implementations, the CPE device 305 processes and transmits the logs immediately following the unanticipated failure (315) (e.g., before re-initialization). In other alternative implementations, the CPE device 305 processes and stores the logs (320) in NVM and transmits a notice of an unanticipated failure to the central server 305 in lieu of setting a failure flag register. In still further implementations, the CPE device 305 processes and stores the logs in NVM (320) and sets the failure flag register (325) but does not transmits the logs after restart. In such implementations, the central server 310 can periodically poll CPE devices 305 to determine if the failure flag register is set. If the flag is set, the central server 310 will request transmission or access the logs as needed. In still further implementations, the central server 310 can instruct all CPE devices 305 to immediately transmit failure logs if their failure flag register is set. In additional implementations, the central server 310 can instruct the device to clear the failure flag register (345), either prior to or after receipt of the logs.

Figure 4:
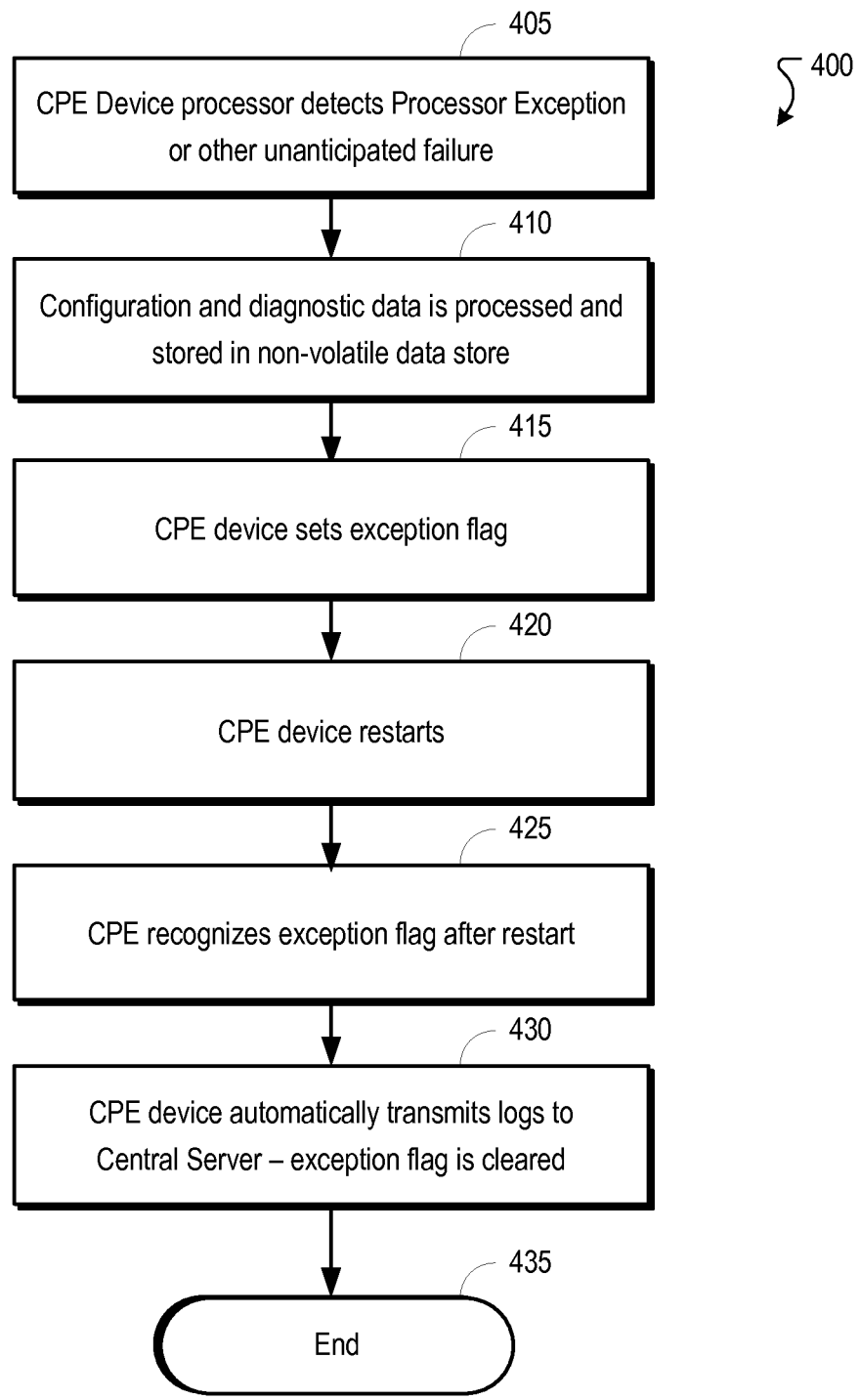
FIG. 4 is a flowchart illustrating an example process operable to provide log storage and retrieval.

FIG. 4 is a flowchart illustrating an example process 400 operable to provide log storage and retrieval. The process 400 begins at stage 405 when a processor exception or other unanticipated failure is detected. The processor exception or other unanticipated failure can be detected, for example, by a CPE device processor (e.g., processor 220 of FIG. 2). In some implementations, the unanticipated failure is a lockup or other unknown state that affects normal operations of the CPE device. In still further implementations, the unanticipated failure is triggered by a configuration or instruction received from an external device.

At stage 410, configuration and diagnostic data logs are processed and stored in NVM for retrieval following restart.

The processing occurs, for example, using a CPE device processor (e.g., processor 220 of FIG. 2) to gather and assemble configuration and diagnostic data (e.g., configuration and diagnostic data 230 of FIG. 2) into logs stored into a data store (e.g., data store 240. The storing occurs, for example, at the CPE device data store (e.g., data store 240 of FIG. 2). In some examples, the logs can include hardware or software configuration information. In alternative implementations, the logs are stored in another storage device, such as RAM that is not to be refreshed (i.e. will retain its value after restart). In still further implementations, the logs are transmitted immediately to the central server (e.g., central server 130 of FIG. 1) without the need for storage.

In other implementations, the processing and storing of logs can be a continuous process. For example, the processing and storing of logs might occur daily or weekly. It should be understood that in the case of a continuous processing and storing of logs, the CPE device can be operable to provide the most recent logs after a catastrophic failure (i.e. after a failure where the device is unable to store or transmit the logs before the unanticipated failure).

At stage 415, the CPE device sets a failure flag register to alert itself at a later time of the unanticipated failure. The failure flag register can be set, for example, by the CPE processor (e.g., processor 220 of FIG. 2) in conjunction with a failure flag location at the CPE device (e.g., failure flag register 250 of FIG. 2). In some implementations, an alternate means of signaling is accomplished, such as transmitting a notice to the central server (e.g., central server 130 of FIG. 1).

At stage 420, the CPE device restarts. The CPE is restarted, for example, by the CPE device processor (e.g., processor 220 of FIG. 2). In other implementations, the CPE device may perform a "soft" software restart or shutdown.

At stage 425, the CPE recognizes the failure flag register after restart. The failure flag register can be recognized, for example, by the processor of the CPE device (e.g., processor 220 of FIG. 2) in conjunction with the failure flag register at the CPE device (e.g., failure flag register 250 of FIG. 2). The failure flag register can be a NVM memory location that is checked on startup. In other implementations, the CPE device can transmit a notice to an external device prior to restart, or the CPE device can set a failure flag register in an external device. In those implementations where the failure flag register is set in an external device, the recognition of the failure flag register can be made by the external device and can be communicated to the CPE device.

Finally, at stage 430, the CPE device automatically transmits the logs to the central server and clears the failure flag register. The logs can be automatically transmitted to the central server (e.g., central server 130 of FIG. 1), for example, by a processor associated with the CPE device (e.g., processor 220 of FIG. 2) in conjunction with a data store (e.g., data store 240 of FIG. 2). The failure flag register can be cleared, for example, by a system processor (e.g., processor 220 of FIG. 2) in conjunction with a failure flag register (e.g., failure flag register 250 of FIG. 2). The process 400 ends at stage 435.

In other implementations, the predetermined location is not a central server, but another device connected to the network. In another implementation, the failure flag register is cleared by the central server, either before or after receipt of the logs. In still further implementations, the logs are not sent automatically, but are processed and stored until requested by the central server. For example, the central server may periodically poll CPE devices for failure flags and request logs from the devices with set flags. Subsequently, either the device or the central server can clear the flag. In another example, the central server may request all CPE devices to check their failure flag registers and transmit logs if the failure flag register is set. The device would then clear the failure flag register upon successful transmission.

Figure 5:
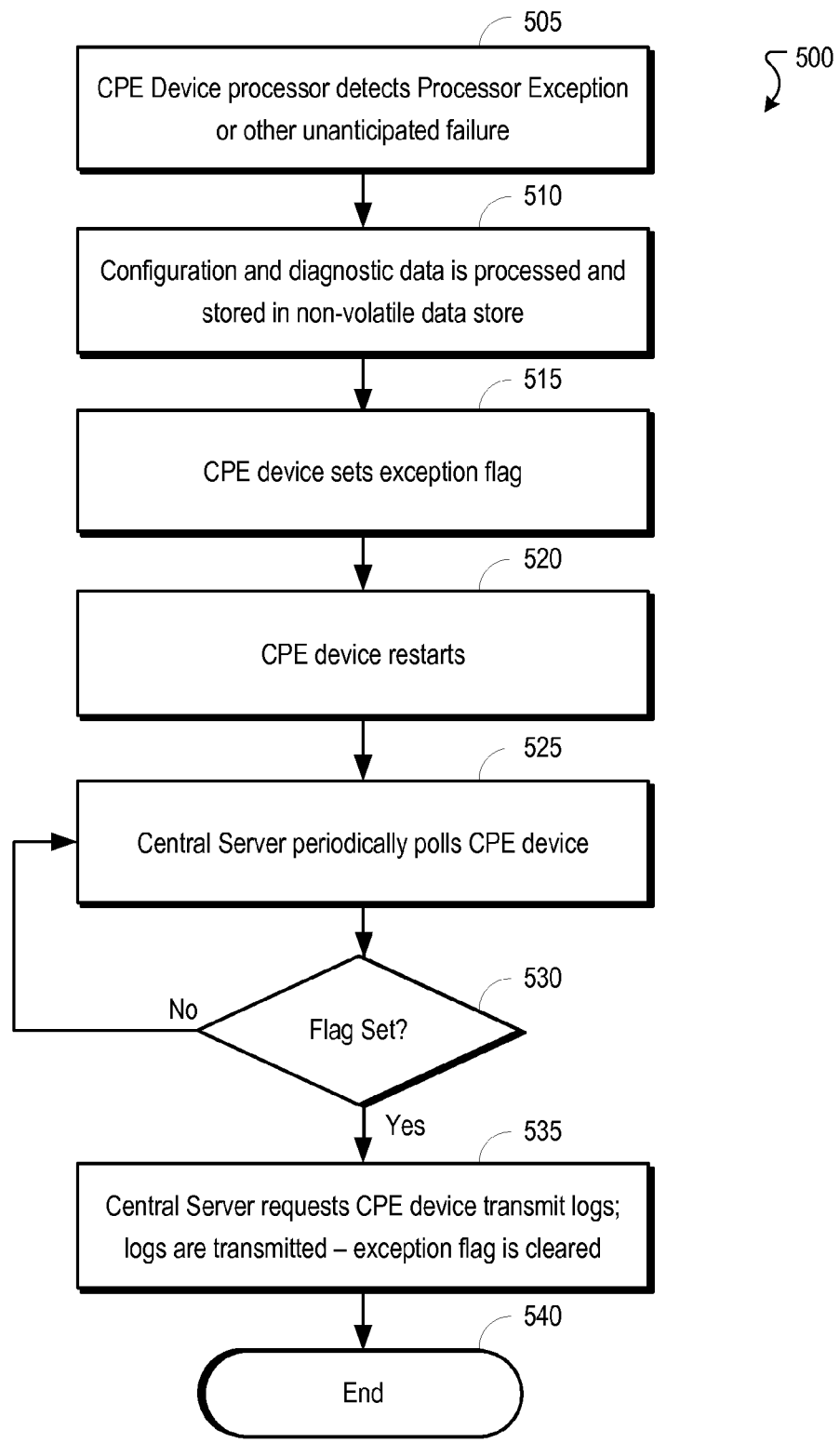
FIG. 5 is a flowchart illustrating another example process operable to provide log storage and retrieval.

FIG. 5 is a flowchart illustrating another example process 500 operable to provide log storage and retrieval. The process 500 begins at stage 505 where a processor exception or other unanticipated failure is identified. The processor exception can be identified, for example, by a CPE device processor (e.g., processor 220 of FIG. 2). In some implementations, the unanticipated failure can be a lockup, exception or other unknown state that affects normal operations of the CPE device. In still further implementations, the unanticipated failure is triggered by a configuration or instruction from an external device.

At stage 510, configuration and diagnostic data logs are processed and stored in NVM for retrieval following restart. The configuration and diagnostic data logs can be processed, for example, by a CPE device processor (e.g., processor 220 of FIG. 2) in conjunction with configuration and diagnostic data memory (e.g., configuration and diagnostic data 230 of FIG. 2). The storage of the configuration and diagnostic data logs occurs, for example, at the CPE device data store (e.g., data store 240 of FIG. 2). In alternative implementations, the logs are stored in a volatile storage device, such as RAM that is not to be refreshed (i.e. will retain its value after restart). In still further implementations, the logs can be transmitted immediately to the central server (e.g., central server 130 of FIG. 1) without the need for storage.

In other implementations, the processing and storing of logs can be a continuous process. For example, the processing and storing of logs can occur periodically (e.g., such as daily or weekly). It should be understood that in the case of a continuous processing and storing of logs, the CPE device can be operable to provide the most recent logs after a catastrophic failure (i.e. after a failure where the device is unable to store or transmit the logs before the unanticipated failure).

At stage 515, the CPE device sets a failure flag register to alert the central server at a later time of the unanticipated failure. The setting of the failure flag register can occur, for example, at the failure flag register location of the CPE device (e.g., failure flag register 250 of FIG. 2). In some implementations, an alternative means of signaling is accomplished, such as transmitting a notice to the central server (e.g., central server 130 of FIG. 1).

At stage 520, the CPE device restarts. The CPE can be restarted, for example, by a CPE device processor (e.g., processor 220 of FIG. 2). In some implementations, the CPE device may perform a "soft" software restart.

At stage 525, the CPE device is polled to check the failure flag. The polling can be performed, for example, by transmitting inquiries from a central server (e.g., central server 130 of FIG. 1) to the CPE device (e.g., CPE device 110 of FIG. 1). The failure flag register can take the form of a NVM memory that is checked on startup. In other implementations, the CPE device transmits a notice to an external device prior to restart or sets a flag in an external device. Subsequently, the recognition of the failure flag register can be made by the external device and communicated to the CPE device.

At stage 530, a determination is made whether the failure flag register is set. The determination can be made, for example, by the CPE device (e.g., failure flag register 250 of FIG. 2) or the processor of the CPE device (e.g., processor 220 of FIG. 2) in conjunction with a failure flag register (e.g., failure flag register 250 of FIG. 2). The failure flag register can take the form of data stored in NVM. In other implementations, if the CPE device can transmit a notice to an external device prior to restart or can set the failure flag register externally, then the determination of whether the failure flag register is set needs to be made by the external device and subsequently communicated to the CPE device.

If the failure flag register is not set at stage 530, the process 500 returns to stage 525 for further periodic polling. Polling can be performed, for example, by transmitting inquiries from the central server (e.g., central server 130 of FIG. 1) to the CPE device (e.g., CPE device 110 of FIG. 1). In other implementations, polling is stopped through instructions given by an external device. In still further implementations, polling is not periodic, but occurs at any time the central server determines.

If the failure flag register is set at stage 530, then stored logs are retrieved at stage 535. The stored logs can be retrieved, for example, by a CPE device processor (e.g., processor 220 of FIG. 2), that retrieves the stored logs from the data store (e.g., data store 240 of FIG. 2). The retrieved logs can be transmitted, for example, from the CPE device (e.g., CPE device 110 of FIG. 1) to the central server (e.g., central server 130 of FIG. 1). A failure flag register can also be cleared, for example, at the CPE device (e.g., failure flag register 250 of FIG. 2). The process 500 ends at stage 540. In other implementations, the central server can clear the flag either before or after receipt of the logs.

Figure 6:
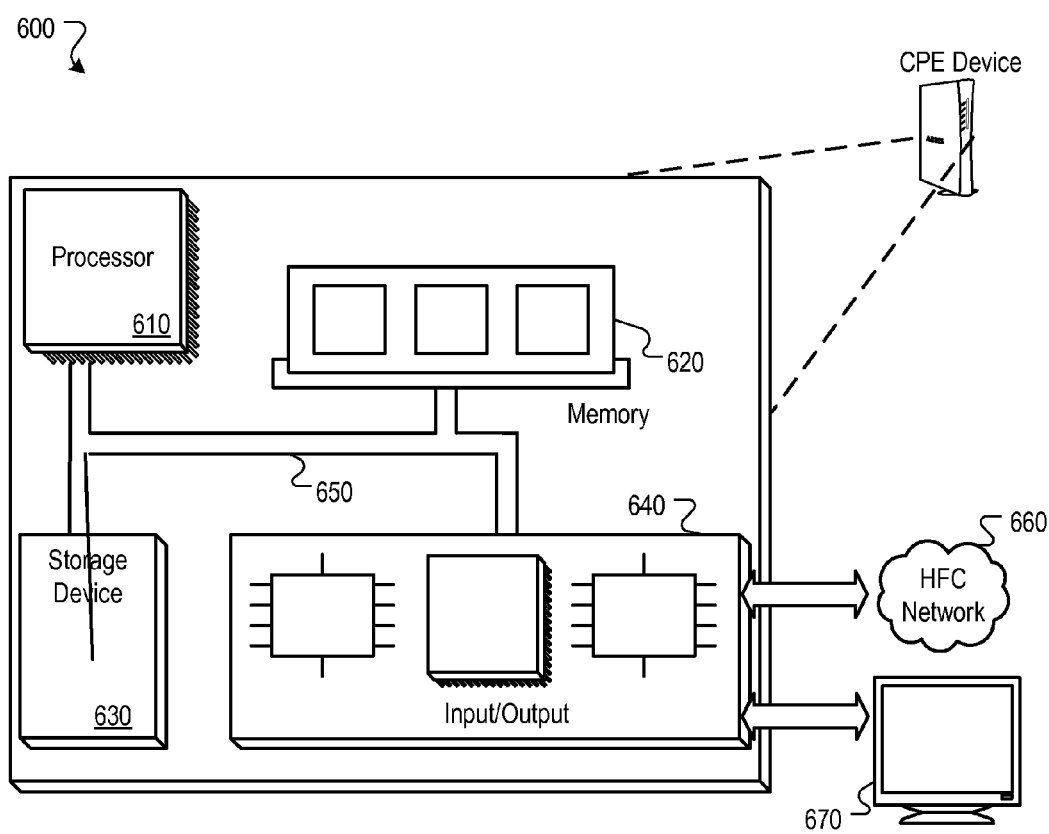
FIG. 6 is a block diagram of a broadband communications device operable to provide log storage and retrieval.

FIG. 6 is a block diagram of a broadband communications device operable to provide log storage and retrieval. The CPE device 600 can include a processor 610, a memory 620, a storage device 630, and an input/output device 640. Each of the components 610, 620, 630, and 640 can, for example, be interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the device 600. In one implementation, the memory 620 is a computer-readable medium. In one implementation, the memory 620 is a volatile memory unit. In another implementation, the memory 620 is a non-volatile memory unit.

In some implementations, the storage device 630 is capable of providing mass storage for the device 600. In one implementation, the storage device 630 is a computer-readable medium. In various different implementations, the storage device 630 can, for example, include a hard disk device, an optical disk device, flash memory or some other large capacity storage device.

The input/output device 640 provides input/output operations for the device 600. In one implementation, the input/output device 640 can include one or more of a wireless interface, HFC network interface 660, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices (e.g., a computer 670), as well as sending communications to, and receiving communications from various networks.

The device (e.g., a CPE device) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer-implemented method for log storage and retrieval for a broadband communications device, the method comprising:
    detecting an unanticipated failure within a broadband communications device using a processor in the broadband communications device;
    executing failure handling instructions on the processor, the failure handling instructions being operable to cause the processor to assemble logs comprising configuration and diagnostic data; and
    transmitting the assembled logs to an external device using a network interface within the broadband communications device.

2. The computer-implemented method of claim 1, further comprising:
    storing the assembled logs in a data store responsive to execution of the failure handling instructions by the processor; and
    restarting the broadband communications device based upon the failure handling instructions executed by the processor.

3. The computer-implemented method of claim 2, further comprising:
    setting a failure flag register in storage based upon execution of failure handling instructions by the processor.

4. The computer-implemented method of claim 3, further comprising:
    receiving a request from an external device for status of the failure flag register; and
    providing status of the failure flag register to the external device;
    receiving a request for the assembled logs from the external device based upon providing the status of the failure flag register;
    transmitting the assembled logs to the external device; and
    clearing the failure flag register responsive to an instruction from the processor.

5. The computer-implemented method of claim 4, further comprising:
    receiving a command to clear the failure flag register from the external device; and
    clearing the failure flag register based upon receiving the command to clear the failure flag register from the external device.

6. The computer-implemented method of claim 3, further comprising:
    detecting the failure flag register responsive to execution of the failure handling instructions by the processor;
    transmitting the assembled logs to the external device using the network interface, the transmission of the assembled logs being responsive to execution of failure handling instructions by the processor; and
    clearing the failure flag register responsive to execution of failure handling instructions by the processor.

7. The computer-implemented method of claim 6, further comprising:
    receiving a command to clear the failure flag register from the external device; and
    clearing the failure flag register based upon receiving the command to clear the failure flag register from the external device.

8. The computer-implemented method of claim 1, wherein transmitting the assembled logs to the external device using the network interface occurs prior to restarting the device, and the method further comprises:
- restarting the broadband communications device responsive to execution of the failure handling instructions by the processor.

9. A broadband communications device, comprising:
- a device processor operable to execute instructions and to perform operations responsive to the instructions;
- one or more computer readable media operable to provide instructions causing the processor to perform operations comprising:
  - identifying an unanticipated failure on the broadband communications device;
  - executing a failure handling process, the failure handling process being operable to cause the processor to assemble diagnostic information based upon the current state of the broadband communications device and to transmit the assembled diagnostic information to a central server for use in diagnosing a problem with the broadband communications device.

10. The broadband communications device of claim 9, further comprising a data store configured to store the assembled diagnostic information, wherein the processor is further operable to store the assembled diagnostic information, and said processor being further operable to retrieve said logs from said data store for external transmission.

11. The broadband communications device of claim 10, further comprising a programmable failure flag register configured to store a programmable failure flag, the failure flag register being detectable or accessible upon restart.

12. The broadband communications device of claim 11, wherein the failure flag register is further operable to provide access for external polling.

13. One or more non-transitory computer-readable media having instructions stored thereon, the one or more computer readable media, when executed by a processor, cause the processor to perform operations comprising:
- detecting an unanticipated problem in a broadband communications device using a processor in the broadband communications device;
- executing error handling instructions on the processor, the error handling instructions being operable to cause the processor to assemble logs comprising configuration and diagnostic data; and
- transmitting the assembled logs to an external device using a network interface.

14. The one or more computer-readable media of claim 13, wherein the instructions are further operable to cause the processor to perform operations comprising:
- storing the assembled logs in a data store responsive to execution of the error handling instructions by the processor; and
- restarting the broadband communications device based upon the error handling instructions executed by the processor.

15. The one or more computer-readable media of claim 14, wherein the instructions are further operable to cause the processor to perform an operation comprising:
- setting a error flag register in storage based upon execution of error handling instructions by the processor.

16. The one or more computer-readable media of claim 15, wherein the instructions are further operable to cause the processor to perform operations comprising:
- receiving a request from an external device for status of the error flag register; and
- providing status of the error flag register to the external device;
- receiving a request for the assembled logs from the external device based upon providing the status of the error flag register;
- transmitting the assembled logs to the external device; and
- clearing the error flag register responsive to an instruction from the processor.

17. The one or more computer-readable media of claim 16, wherein the instructions are further operable to cause the processor to perform operations comprising:
- receiving a command to clear the error flag register from the external device; and
- clearing the error flag register based upon receiving the command to clear the error flag register from the external device.

18. The one or more computer-readable media of claim 15, wherein the instructions are further operable to cause the processor to perform operations comprising:
- detecting the error flag register responsive to execution of the error handling instructions by the processor;
- transmitting the assembled logs to the external device using the network interface, the transmission of the assembled logs being responsive to execution of error handling instructions by the processor; and
- clearing the error flag register responsive to execution of error handling instructions by the processor.

19. The one or more computer-readable media of claim 18, wherein the instructions are further operable to cause the processor to perform operations comprising:
- receiving a command to clear the error flag register from the external device; and
- clearing the error flag register based upon receiving the command to clear the error flag register from the external device.

20. The one or more computer-readable media of claim 15, wherein transmitting the assembled logs to the external device using the network interface occurs prior to restarting the device, and the instructions are further operable to cause the processor to perform an operation comprising:
- restarting the broadband communications device responsive to execution of the error handling instructions by the processor.

* * * * *